(12) United States Patent
Sugiyama et al.

(10) Patent No.: US 11,869,549 B2
(45) Date of Patent: Jan. 9, 2024

(54) DISK DRIVE SUSPENSION INCLUDING A FLEXURE WITH AN ELECTRODE CONNECTION PORTION THAT HAS REGIONS OF DIFFERENT THICKNESSES

(71) Applicant: NHK SPRING CO., LTD., Yokohama (JP)

(72) Inventors: Shinji Sugiyama, Yokohama (JP); Naoki Tanaka, Yokohama (JP); Kazuhiro Sugiyama, Yokohama (JP); Shuntaro Numata, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 0 days.

(21) Appl. No.: 18/176,800

(22) Filed: Mar. 1, 2023

(65) Prior Publication Data

US 2023/0282230 A1   Sep. 7, 2023

(30) Foreign Application Priority Data

Mar. 3, 2022   (JP) ................................ 2022-032762

(51) Int. Cl.
*G11B 5/48*   (2006.01)

(52) U.S. Cl.
CPC .......... *G11B 5/4833* (2013.01); *G11B 5/4873* (2013.01)

(58) Field of Classification Search
CPC ............................ G11B 5/4833; G11B 5/4873
See application file for complete search history.

(56) References Cited

U.S. PATENT DOCUMENTS

| 7,183,696 | B2 * | 2/2007 | Yamazaki | G11B 5/484 310/330 |
|---|---|---|---|---|
| 8,797,689 | B1 | 8/2014 | Pan et al. | |
| 10,749,101 | B2 * | 8/2020 | Ikeda | G11B 5/483 |
| 2010/0290158 | A1 * | 11/2010 | Hanya | G11B 5/4833 |
| 2011/0141624 | A1 * | 6/2011 | Fuchino | G11B 5/4873 29/603.07 |
| 2011/0228425 | A1 * | 9/2011 | Liu | G11B 5/4853 360/244.2 |
| 2011/0317309 | A1 * | 12/2011 | Shum | G11B 5/486 |
| 2012/0002329 | A1 * | 1/2012 | Shum | G11B 5/486 |
| 2013/0301164 | A1 * | 11/2013 | Nishida | G11B 5/4833 156/272.8 |
| 2023/0029666 | A1 * | 2/2023 | Suzuki | G11B 5/4853 |

* cited by examiner

*Primary Examiner* — Brian E Miller
(74) *Attorney, Agent, or Firm* — Holtz, Holtz & Volek PC

(57) ABSTRACT

A suspension for a disk drive includes a plate member having a first surface, a second surface opposite to the first surface, a first penetration portion penetrating the first surface and the second surface, and a second penetration portion spaced from the first penetration portion and penetrating the first surface and the second surface, an actuator provided on the second surface and having an electrode located in the first penetration portion, and a flexure having an electrode connection portion connected to the electrode. The electrode connection portion includes a first region and a second region having a thickness smaller than a thickness of the first region, and the second region overlaps the second penetration portion.

7 Claims, 7 Drawing Sheets

COMPARATIVE EXAMPLE

DISK DRIVE SUSPENSION INCLUDING A FLEXURE WITH AN ELECTRODE CONNECTION PORTION THAT HAS REGIONS OF DIFFERENT THICKNESSES

CROSS-REFERENCE TO RELATED APPLICATIONS

This application is based upon and claims the benefit of priority from prior Japanese Patent Application No. 2022-032762, filed on Mar. 3, 2022, the entire contents of which are incorporated herein by reference.

BACKGROUND OF THE INVENTION

1. Field of the Invention

The present invention relates to a suspension for a disk drive.

2. Description of the Related Art

A hard disk drive (HDD) is used in an information processing apparatus such as a personal computer. The hard disk drive includes a magnetic disk that rotates about a spindle, a carriage that turns about a pivot shaft, and the like. The carriage has an arm, and is turned in a track width direction of the disk about the pivot shaft by a positioning motor such as a voice coil motor.

A suspension for a disk drive (hereinafter, it is simply referred to as a suspension) is attached to the arm. The suspension includes a load beam, a flexure overlaid on the load beam, and the like. A slider constituting a magnetic head is provided in a gimbal portion formed near the tip of the flexure.

The slider is provided with an element (transducer) for performing access such as reading or writing of data. The load beam, the flexure, the slider, and the like constitute a head gimbal assembly.

In order to cope with high recording density of the disk, it is necessary to further downsize the head gimbal assembly and to position the slider with respect to a recording surface of the disk with higher accuracy.

For the purpose of improving positioning accuracy of the magnetic head, a dual stage actuator (DSA) suspension using a positioning motor (voice coil motor) and an actuator mounted on a base plate side, a triple stage actuator (TSA) suspension in which an actuator is mounted on the magnetic head side, and the like are known.

For example, the stress generated in the actuator mounted on the base plate side tends to increase when the base plate is attached to the arm by a caulking process using a ball or when subjected to vibration; and if the stress reaches to a certain level or more, a crack or the like may occur in the actuator.

U.S. Pat. No. 8,797,689 B discloses a disk drive head suspension assembly having piezoelectric element stress relaxation characteristics. In the disk drive head suspension assembly, an etched region including a through hole is provided in a portion where the actuator is mounted.

Even in the disk drive head suspension assembly disclosed in U.S. Pat. No. 8,797,689 B, there is still room for various improvements in improving the reliability of the suspension.

BRIEF SUMMARY OF THE INVENTION

An object of the present invention is to provide a suspension for a disk drive capable of improving reliability.

According to one embodiment, a suspension for a disk drive comprises a plate member having a first surface, a second surface opposite to the first surface, a first penetration portion penetrating the first surface and the second surface, and a second penetration portion spaced from the first penetration portion and penetrating the first surface and the second surface, an actuator provided on the second surface and having an electrode located in the first penetration portion, and a flexure having an electrode connection portion connected to the electrode.

The electrode connection portion includes a first region and a second region having a thickness smaller than a thickness of the first region, and the second region overlaps the second penetration portion in a thickness direction of the flexure.

The flexure may include a metal base overlaid on the first surface and a wiring portion overlaid on the metal base, and in the first region, the metal base may include a wiring reinforcement portion.

The second penetration portion may be located on a distal end side of the flexure with respect to the first penetration portion in a longitudinal direction, and the wiring reinforcement portion may be located between the first penetration portion and the second penetration portion in the longitudinal direction.

The second penetration portion may be located on a distal end side of the flexure with respect to the first penetration portion in the longitudinal direction, and the second penetration portion may be located between the wiring reinforcement portion and the first penetration portion in the longitudinal direction.

The flexure further may include a flexure main body to which the electrode connection portion is connected, and the wiring reinforcement portion may be separated from the metal base of the flexure main body. The flexure further may include a flexure main body to which the electrode connection portion is connected, and the wiring reinforcement portion may extend from the metal base of the flexure main body.

The suspension may include an adhesive material provided between the plate member and the actuator, at least a part of the adhesive material may be provided in the second penetration portion.

According to the suspension for a disk drive having such a configuration, reliability can be improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
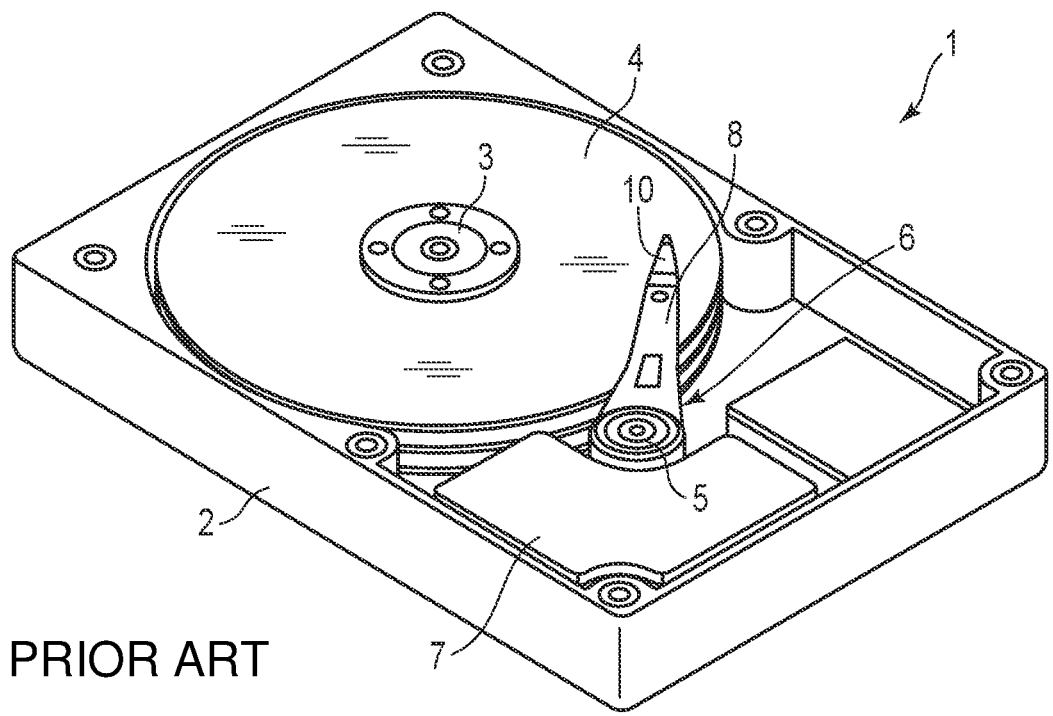
FIG. 1 is a schematic perspective view illustrating an example of a disk drive.

Embodiments of the present invention will be described hereinafter with reference to the accompanying drawings. In addition, in some cases, in order to make the description clearer, the widths, thicknesses, shapes, etc., of the respective parts may be schematically illustrated in the drawings, compared to the actual modes.

First Embodiment

FIG. 1 is a schematic perspective view illustrating an example of a disk drive (HDD) 1. In the example illustrated in FIG. 1, the disk drive 1 includes a case 2, a plurality of magnetic disks (hereinafter simply referred to as disk 4) that rotate about a spindle 3, a carriage 6 that is turnable about a pivot shaft 5, and a positioning motor (voice coil motor) 7 for driving the carriage 6. The case 2 is sealed by a lid (not illustrated).

Figure 2:
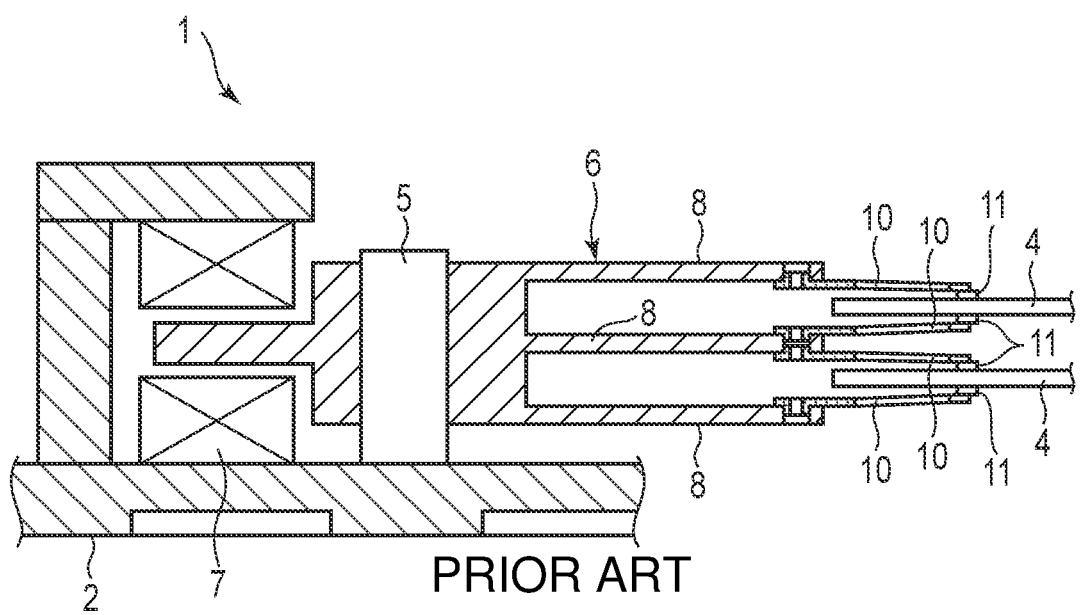
FIG. 2 is a schematic cross-sectional view illustrating a part of the disk drive.

FIG. 2 is a schematic cross-sectional view illustrating a part of the disk drive 1. As illustrated in FIGS. 1 and 2, the carriage 6 is provided with a plurality of (for example, three) arms 8. The number of arms 8 provided in the carriage 6 is not limited to the above example.

The plurality of arms 8 each have a suspension 10 attached to a tip portion thereof. Each suspension 10 is provided, at a tip portion thereof, with a slider 11 constituting a magnetic head. When the disk 4 rotates at a high speed, air flows between the disk 4 and the slider 11 to form an air bearing. When the carriage 6 is turned by the positioning motor 7, the suspension 10 moves in the radial direction of the disk 4, so that the slider 11 moves to a desired track of the disk 4.

Figures 3, 4:
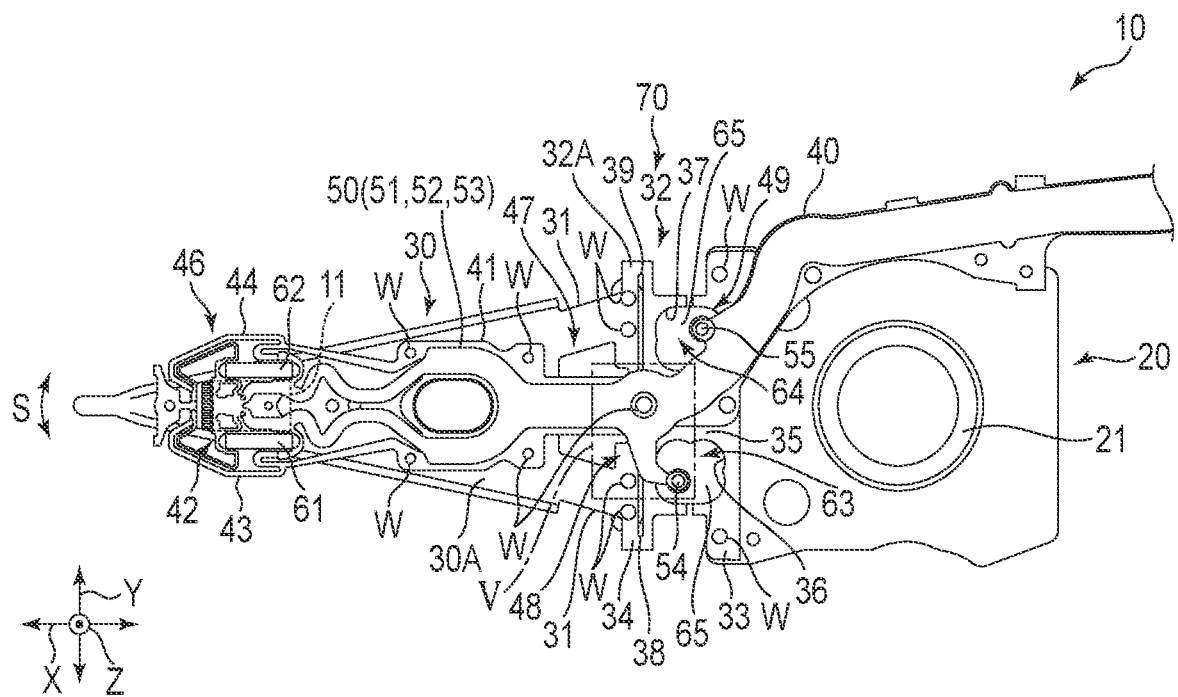
FIG. 3 is a schematic plan view of a suspension according to a first embodiment.
FIG. 4 is another schematic plan view of the suspension according to the first embodiment.

FIGS. 3 and 4 are schematic plan views of the suspension 10 according to a first embodiment. In FIG. 4, the suspension 10 is viewed from the opposite side of FIG. 3. In the present embodiment, as an example of the suspension 10, a TSA suspension in which actuators are mounted on the magnetic head side and a base plate side is disclosed.

As illustrated in FIGS. 3 and 4, the suspension 10 includes a base plate 20 connected to the arm 8 (illustrated in FIG. 2), a load beam 30, and a flexure 40. The base plate 20, the load beam 30, and the flexure 40 all extend in a longitudinal direction of the suspension 10.

Hereinafter, a longitudinal direction of the suspension 10, the base plate 20, the load beam 30, and the flexure 40 is defined as a longitudinal direction X. In the longitudinal direction X, a side on which the slider constituting the magnetic head is mounted, with reference to the base plate 20, may be referred to as a distal end side.

A direction orthogonal to the longitudinal direction X is defined as a lateral direction Y of the suspension 10, the base plate 20, the load beam 30, the flexure 40, and the like. A direction intersecting (for example, orthogonal to) the longitudinal direction X and the lateral direction Y is defined as a thickness direction Z of the suspension 10, the base plate 20, the load beam 30, the flexure 40, and the like. Hereinafter, the length along the thickness direction Z may be referred to as thickness. Further, a sway direction S is defined as indicated by an arcuate arrow in the vicinity of the tip of the load beam 30.

The base plate 20 is made of a metal material such as stainless steel. The thickness of the base plate 20 is, for example, 100 μm or less, but is not limited to this example. The base plate 20 is provided with a boss portion 21 for attaching the suspension 10 to the arm 8 (shown in FIGS. 1 and 2) of the carriage 6.

The load beam 30 is formed of a metal material such as stainless steel. The thickness of the load beam 30 is, for example, 30 to 80 μm. The load beam 30 has a shape tapered toward the tip.

As illustrated in FIG. 3, the load beam 30 is fixed to the base plate 20 in welded portions W by spot welding using a laser, for example. The load beam 30 is elastically supported by the base plate 20 via a spring portion 31. The load beam 30 has a surface 30A (shown in FIG. 3) and a surface 30B (shown in FIG. 4) opposite to the surface 30A. The surface 30A is a surface on a side where the flexure 40 is disposed.

The flexure 40 is disposed along the base plate 20 and the load beam 30. The flexure 40 is fixed to the base plate 20 and the load beam 30 in the welded portions W by spot welding using a laser, for example. The flexure 40 has a portion extending rearward (right side in FIGS. 3 and 4) of the base plate 20.

The flexure 40 includes a metal base 41 made of, for example, a thin stainless steel plate, and a wiring portion 50 overlaid on the metal base 41. The thickness of the metal base 41 is smaller than the thickness of the load beam 30. The thickness of the metal base 41 is, for example, 15 to 20 μm. The metal base 41 is overlaid on the surface 30A.

The wiring portion 50 includes a base insulating layer 51, a conductor layer 52 overlaid on the base insulating layer 51, and a cover insulating layer 53 overlaid on the conductor layer 52. The base insulating layer 51 and the cover insulating layer 53 are formed of, for example, an electrically insulating resin material such as polyimide.

The conductor layer 52 is formed of a metal material having high conductivity such as copper. The conductor layer 52 includes, for example, a plurality of wirings. The plurality of wirings include, for example, a reading wiring and a writing wiring. The plurality of wirings are covered with the cover insulating layer 53.

As illustrated in FIG. 3, the flexure 40 further includes a tongue 42 and a pair of outriggers 43 and 44 in the vicinity of the tip of the suspension 10. The slider 11 constituting the magnetic head is mounted on the tongue 42. The slider 11 is provided, at a tip portion thereof, with elements capable of converting a magnetic signal and an electric signal, such as MR elements.

The wiring portion 50 is electrically connected to the elements of the slider 11 via a terminal for the slider 11. Access such as writing or reading of data with respect to the disk 4 is performed by these elements.

The slider 11, the load beam 30, the flexure 40, and the like constitute a head gimbal assembly. The outriggers 43 and 44 are disposed on both sides of the tongue 42 in the lateral direction Y.

The outriggers 43 and 44 have shapes protruding to both outer sides of the tongue 42 in the lateral direction Y. Each of the tongue 42 and the outriggers 43 and 44 is a part of the metal base 41, and their respective contours are formed by etching, for example.

A dimple 45 (shown in FIG. 4) protruding toward the tongue 42 is formed in the vicinity of the tip of the load beam 30. The tip of the dimple 45 is in contact with the tongue 42. The tongue 42 may swing about the tip of the dimple 45 to provide a desired gimbal motion. A gimbal portion 46 is composed of the tongue 42, the pair of outriggers 43 and 44, the dimple 45, and the like.

A pair of actuators 61 and 62 (shown in FIG. 3) is mounted on the gimbal portion 46. The actuators 61 and 62 have a function of rotating the tongue 42 in the sway direction S. The actuators 61 and 62 are, for example, microactuator elements, and are formed of a piezoelectric body such as lead zirconate titanate (PZT).

The actuators 61 and 62 are disposed on both sides of the slider 11 in the lateral direction Y. The actuators 61 and 62 are fixed to the tongue 42 by a conductive adhesive material or the like.

As illustrated in FIGS. 3 and 4, the suspension 10 further includes an actuator mounting portion 70. The actuator mounting portion 70 is located, for example, in a portion where the base plate 20 and the load beam 30 overlap in the thickness direction Z.

The actuator mounting portion 70 includes the base plate 20, the load beam 30, and a pair of actuators 63 and 64. The actuators 63 and 64 are, for example, microactuator elements, and are formed of a piezoelectric body such as lead zirconate titanate (PZT).

The base plate 20 includes a fixed portion 22 in which the boss portion 21 is formed, a movable portion 23 located on the distal end side of the suspension 10 with respect to the fixed portion 22, and a connecting portion 24 that connects the fixed portion 22 and the movable portion 23. The movable portion 23 is a portion movable in the sway direction S by the pair of actuators 63 and 64, for example. The connecting portion 24 extends in the longitudinal direction X.

In the base plate 20, a pair of openings 25 and 26 is defined by the fixed portion 22, the movable portion 23, and the connecting portion 24. The openings 25 and 26 have a size capable of accommodating the actuators 63 and 64. In the longitudinal direction X, the openings 25 and 26 are located between the fixed portion 22 and the movable portion 23. The openings 25 and 26 are arranged in the lateral direction Y with the connecting portion 24 interposed therebetween.

The load beam 30 has a portion overlapping the base plate 20. Hereinafter, the portion overlapping the base plate 20 is referred to as a plate member 32. In the present embodiment, the plate member 32 is formed integrally with the load beam 30, but the present invention is not limited to this example.

The plate member 32 has a surface 32A (a first surface) and a surface 32B (a second surface) opposite to the surface 32A. The surface 32A corresponds to a part of the surface 30A (shown in FIG. 3) of the load beam 30, and the surface 32B corresponds to a part of the surface 30B (shown in FIG. 4) of the load beam 30. The surface 32A faces the flexure 40, and the surface 32B faces the base plate 20.

The plate member 32 includes a fixed portion 33, a movable portion 34 located on the distal end side of the suspension 10 with respect to the fixed portion 33, and a connecting portion 35 that connects the fixed portion 33 and the movable portion 34. The fixed portion 33 is formed at a position corresponding to the fixed portion 22, the movable portion 34 is formed at a position corresponding to the movable portion 23, and the connecting portion 35 is formed at a position corresponding to the connecting portion 24.

The fixed portion 33 and the movable portion 34 of the plate member 32 are fixed to the fixed portion 22 and the movable portion 23 of the base plate 20, respectively, in the welded portions W. In the example illustrated in FIGS. 3 and 4, the length of the movable portion 34 in the lateral direction Y is longer than the length of the movable portion 23 in the lateral direction Y. The spring portion 31 is connected to the movable portion 34 from the side opposite to the connecting portion 35.

The plate member 32 further includes a pair of first penetration portions 36 and 37 and a pair of second penetration portions 38 and 39. The first penetration portions 36 and 37 and the second penetration portions 38 and 39 penetrate the surface 32A and the surface 32B.

The first penetration portions 36 and 37 are defined by the fixed portion 33, the movable portion 34, and the connecting portion 35. Parts of the first penetration portions 36 and 37 are opened in the lateral direction Y. In the thickness direction Z, the first penetration portions 36 and 37 overlap the openings 25 and 26.

In the longitudinal direction X, the first penetration portions 36 and 37 are positioned between the fixed portion 33 and the movable portion 34. The first penetration portions 36 and 37 are arranged in the lateral direction Y with the connecting portion 35 interposed therebetween. In the example illustrated in FIG. 3, the sizes of the first penetration portions 36 and 37 are smaller than the sizes of the openings 25 and 26. From another point of view, the plate member 32 has a portion overlapping the openings 25 and 26 in the thickness direction Z.

The second penetration portions 38 and 39 are provided for the purpose of, for example, relaxing stress generated in the actuators 63 and 64. The second penetration portions 38 and 39 are located in the movable portion 34. From another point of view, in the longitudinal direction X, the second penetration portions 38 and 39 are located on the distal end side of the flexure 40 with respect to the first penetration portions 36 and 37. The second penetration portions 38 and 39 are spaced from the first penetration portions 36 and 37.

The second penetration portions 38 and 39 are formed in an elongated slit shape extending in the lateral direction Y. The second penetration portions 38 and 39 include portions extending in the lateral direction Y with respect to the movable portion 23. Both ends of the second penetration portions 38 and 39 in the lateral direction Y are formed in an arc shape.

The length of the second penetration portions 38 and 39 in the longitudinal direction X is smaller than the length of the movable portion 34 in the longitudinal direction X. The shapes of the second penetration portions 38 and 39 are not limited to the above-described example. The second penetration portions 38 and 39 may be composed of, for example, a plurality of through holes arranged in the lateral direction Y. The welded portions W in the movable portion 34 is located on the distal end side of the suspension 10 with respect to the second penetration portions 38 and 39.

The actuators 63 and 64 are accommodated in the openings 25 and 26, respectively, and are provided on the surface 32B. The actuator mounting portion 70 further includes an adhesive material 81. In FIG. 4, the adhesive material 81 is shown with dots. The adhesive material 81 mainly fixes the actuators 63 and 64 and the plate member 32. The adhesive material 81 is, for example, an electrically insulating resin adhesive material such as epoxy resin.

The actuators 63 and 64 each include an electrode 65 provided on a surface on one side in the thickness direction Z (a surface facing the surface 32B) and an electrode 66 provided on a surface on the other side in the thickness direction Z.

The electrodes 65 and 66 each form a flat electrode surface by, for example, sputtering or plating. The electrodes 65 are provided at positions corresponding to the first penetration portions 36 and 37. From another point of view, the electrodes 65 are exposed from the first penetration portions 36 and 37.

The electrodes 65 are connected to the wiring portion 50 of the flexure 40 via terminal portions 54 and 55 (shown in FIG. 3). The electrodes 66 are electrically connected to the movable portion 23 of the base plate 20 on the ground side by conductive pastes 82 (shown in FIG. 4) such as a silver paste.

In FIG. 4, the conductive pastes 82 are shown with dots. The conductive pastes 82 contain, for example, a binder of an organic resin such as epoxy resin, and silver particles as conductive particles mixed in the binder.

The flexure 40 includes a flexure main body 47 extending along the load beam 30, and electrode connection portions 48 and 49 connected to the flexure main body 47. The electrode connection portion 48 extends toward the first penetration portion 36, and the electrode connection portion 49 extends toward the first penetration portion 37.

The electrode connection portion 48 has the terminal portion 54 connected to the electrode 65 of the actuator 63, and the electrode connection portion 49 has the terminal portion 55 connected to the electrode 65 of the actuator 64. The terminal portions 54 and 55 have a structure capable of supplying power to the actuators 63 and 64.

In the terminal portions 54 and 55, the conductor layer 52 is exposed toward the electrode 65 through a through hole formed in the base insulating layer 51. The exposed portion of the conductor layer 52 is protected by plating. The terminal portions 54 and 55 are fixed to the electrode 65 by a conductive adhesive material. The conductive adhesive material is, for example, a silver paste.

Figure 5:
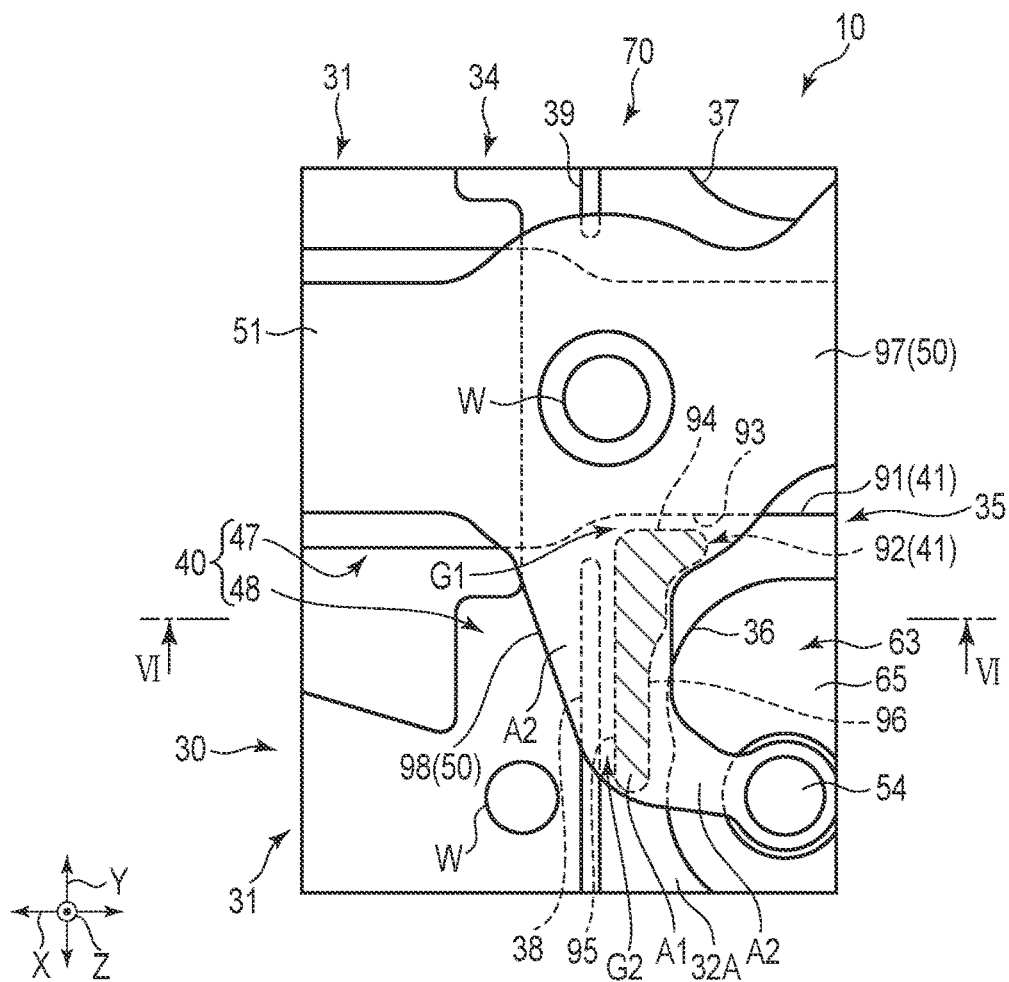
FIG. 5 is a schematic partially enlarged view illustrating a portion V in FIG. 3.

FIG. 5 is a schematic partially enlarged view illustrating a portion V in FIG. 3. FIG. 5 illustrates a portion including the electrode connection portion 48. In FIG. 5, the conductor layer 52 and the cover insulating layer 53 located on the base insulating layer 51 of the wiring portion 50 are partially omitted.

As described with reference to FIG. 3, the electrode connection portion 48 extends so as to be bent from the flexure main body 47 toward the electrode 65 located in the first penetration portion 36. As illustrated in FIG. 5, in the thickness direction Z, a part of the electrode connection portion 48 overlaps the second penetration portion 38.

The metal base 41 is provided in each of the flexure main body 47 and the electrode connection portion 48. The metal base 41 includes a main metal base 91 provided in the flexure main body 47 and a wiring reinforcement portion 92 provided in the electrode connection portion 48.

The thickness of the main metal base 91 is approximately equal to the thickness of the wiring reinforcement portion 92, for example. In the lateral direction Y, the main metal base 91 has an end portion 93 located on the first penetration portion 36 side.

In the longitudinal direction X, the wiring reinforcement portion 92 is provided so as to be positioned between the first penetration portion 36 and the second penetration portion 38. From another point of view, the wiring reinforcement portion 92 is located closer to the first penetration portion 36 than the second penetration portion 38. The wiring reinforcement portion 92 extends in the lateral direction Y along the second penetration portion 38.

In the lateral direction Y, the wiring reinforcement portion 92 is separated from the main metal base 91. From another point of view, the wiring reinforcement portion 92 is separated from and independent of the main metal base 91. In the example shown in FIG. 5, the wiring reinforcement portion 92 is separated from each of the first penetration portion 36 and the second penetration portion 38. From another point of view, the wiring reinforcement portion 92 does not overlap the first penetration portion 36 and the second penetration portion 38 in the thickness direction Z.

The wiring reinforcement portion 92 has an end portion 94 located on the main metal base 91 side, a side portion 95 on the second penetration portion 38 side, and a side portion 96 on the opposite side (first penetration portion 36 side) to the side portion 95. In the example illustrated in FIG. 5, a gap G1 is defined by the end portion 93 of the main metal base 91 and the end portion 94 of the wiring reinforcement portion 92. The gap G1 extends along the longitudinal direction X. The length of the gap G1 in the lateral direction Y is at least 0.025 mm or more. As an example, the length of the gap G1 in the lateral direction Y is 0.05 mm or more.

In the longitudinal direction X, the side portion 95 is separated from the second penetration portion 38, and the side portion 96 is separated from the first penetration portion 36. A gap G2 is formed between the first penetration portion 36 and the side portion 96. For example, the distance between the first penetration portion 36 and the side portion 96 is at least 0.025 mm or more. For example, the distance between the second penetration portion 38 and the side portion 95 is at least 0.025 mm or more.

The wiring portion 50 is provided in each of the flexure main body 47 and the electrode connection portion 48. The wiring portion 50 includes a main wiring portion 97 provided in the flexure main body 47 and a branch wiring portion 98 provided in the electrode connection portion 48. The branch wiring portion 98 is connected to the main wiring portion 97. The branch wiring portion 98 includes the base insulating layer 51, the conductor layer 52, and the cover insulating layer 53.

The terminal portion 54 is provided at one end of the branch wiring portion 98. In the example illustrated in FIG. 5, the size of the wiring reinforcement portion 92 is smaller than the size of the branch wiring portion 98. From another point of view, the entire wiring reinforcement portion 92 overlaps the branch wiring portion 98.

The electrode connection portion 48 has a first region A1 and a second region A2 having a thickness smaller than that of the first region A1. In FIG. 5, the first region A1 is indicated by hatching. As illustrated in FIG. 5, the first region A1 includes the wiring reinforcement portion 92. Since the second region A2 does not include the wiring reinforcement portion 92, the thickness of the second region A2 is smaller than the thickness of the first region A1 by an amount corresponding to the thickness of the wiring reinforcement portion 92.

The size of the first region A1 is approximately equal to the size of the wiring reinforcement portion 92. In the electrode connection portion 48, a region other than the first region A1 corresponds to the second region A2. In the present embodiment, the terminal portion 54 is not included in the second region A2, but the terminal portion 54 may be included in the second region A2.

In the thickness direction Z, the second region A2 overlaps the second penetration portion 38. The second region A2 is formed in the electrode connection portion 48 so as to include a region overlapping the second penetration portion 38. The second region A2 is also formed between the first region A1 and the terminal portion 54.

Figure 6:
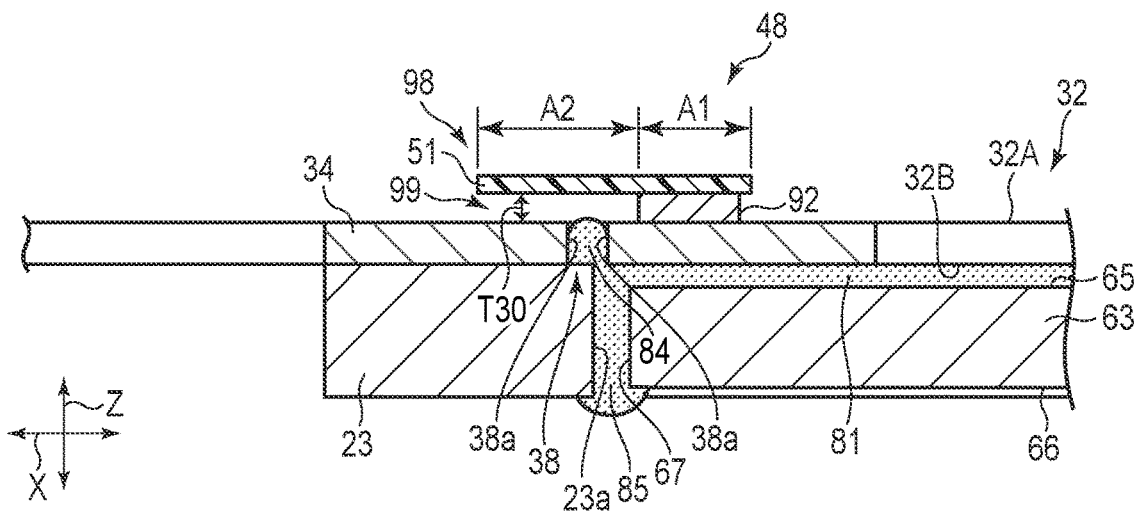
FIG. 6 is a schematic cross-sectional view taken along line VI-VI in FIG. 5.

FIG. 6 is a schematic cross-sectional view taken along line VI-VI in FIG. 5. In FIG. 6, only the base insulating layer 51 included in the branch wiring portion 98 is illustrated.

As described with reference to FIG. 5, the wiring reinforcement portion 92 is not located in the second region A2. Therefore, the distance from the plate member 32 to the electrode connection portion 48 (base insulating layer 51) in the second region A2 in the thickness direction Z is larger than the distance from the plate member 32 to the electrode connection portion 48 (wiring reinforcement portion 92) in the first region A1 in the thickness direction Z.

At the position shown in FIG. 6, the wiring reinforcement portion 92 is in contact with the surface 32A of the plate member 32, but a gap may be formed between the surface 32A of the plate member 32 and the wiring reinforcement portion 92.

An air layer 99 having a thickness T30 (shown in FIG. 6) is formed between the electrode connection portion 48 (base insulating layer 51) in the second region A2 and the plate member 32. In the longitudinal direction X, the air layer 99 is located on the distal end side of the suspension 10 with respect to the wiring reinforcement portion 92.

The thickness T30 of the air layer 99 corresponds to, for example, the thickness of the wiring reinforcement portion 92. The thickness T30 is, for example, 15 to 20 μm, and is 18 μm as an example. In the thickness direction Z, the air layer 99 overlaps the second penetration portion 38.

The thickness T30 of the air layer 99 is larger than the gap formed between the surface 32A of the plate member 32 and the wiring reinforcement portion 92. The base insulating layer 51 in the second region A2 is separated from the plate member 32 by an amount corresponding to the thickness T30.

As illustrated in FIG. 6, the adhesive material 81 is provided between the plate member 32 and the actuator 63. In the example illustrated in FIG. 6, the adhesive material 81 includes a portion 84 provided between inner surfaces 38a of the second penetration portions 38, and a portion 85 provided between an end surface 67 of the actuator 63 and a surface 23a of the movable portion 23. The portion 85 fixes the end surface 67 of the actuator 63 and the surface 23a of the movable portion 23.

At least a part of the adhesive material 81 is provided in the second penetration portion 38. From another point of view, the adhesive material 81 is located in a part of the second penetration portion 38. In the thickness direction Z, the portion 84 is in contact with the air layer 99 and does not overlap with the wiring reinforcement portion 92.

Figure 7:
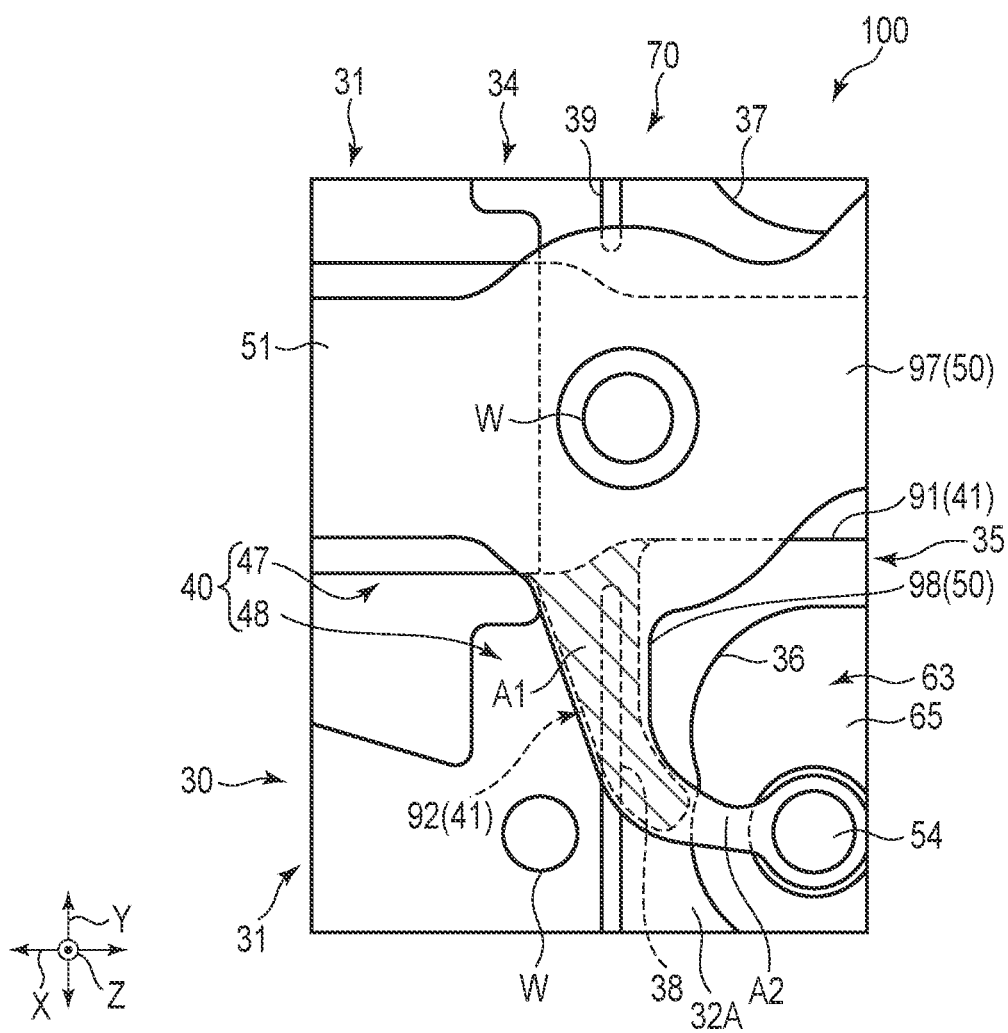
FIG. 7 is a schematic plan view illustrating a comparative example of the suspension according to the first embodiment.

FIG. 7 is a schematic plan view illustrating a comparative example of the suspension 10 according to the first embodiment. In FIG. 7, a portion including an electrode connection portion 48 is illustrated in an enlarged manner.

In a flexure 40 of a suspension 100 which is a comparative example of the suspension 10, a first region A1 of the electrode connection portion 48 overlaps a second penetration portion 38. The first region A1 is formed in the electrode connection portion 48 so as to include a region overlapping the second penetration portion 38.

In the suspension 100 according to the comparative example, a wiring reinforcement portion 92 overlaps the second penetration portion 38. Therefore, an air layer corresponding to the above-described air layer 99 is not formed in the suspension 100 according to the comparative example. From the viewpoint of an adhesive material 81, a portion 84 provided between inner surfaces 38a of the second penetration portions 38 of the adhesive material 81 overlaps the wiring reinforcement portion 92.

When a plate member 32 and an actuator 63 are fixed by the adhesive material 81, a part of the adhesive material 81 may flow from a surface 32B side to a surface 32A side via the second penetration portion 38. When the distance from the plate member 32 to the electrode connection portion 48 in the thickness direction Z is small, the adhesive material 81 spreads on the surface 32A due to a capillary phenomenon between the plate member 32 and the electrode connection portion 48.

When the adhesive material 81 spread on the surface 32A is cured, the rigidity of the suspension 100 changes at the position of the cured adhesive material 81, which may affect characteristics such as vibration characteristics and load characteristics of the suspension 100. These factors may cause a decrease in reliability of suspension 100.

In the suspension 10 configured as described above, the electrode connection portion 48 of the flexure 40 has the first region A1 and the second region A2 having a thickness smaller than that of the first region A1, and the second region A2 overlaps the second penetration portion 38 in the thickness direction Z.

As described with reference to FIG. 6, the electrode connection portion 48 in the second region A2 is separated from the plate member 32 by an amount corresponding to the thickness T30. The air layer 99 is formed between the electrode connection portion 48 in the second region A2 and the plate member 32. Since the wiring reinforcement portion 92 is not provided in the second region A2, the air layer 99 having the thickness T30 can be stably maintained. Further, the air layer 99 overlaps the portion 84 of the adhesive material 81 provided between the inner surfaces 38a of the second penetration portion 38.

According to the present embodiment, even when the adhesive material 81 flows from the surface 32B to the surface 32A via the second penetration portion 38, the electrode connection portion 48 in the second region A2 is separated from the plate member 32, so that a capillary phenomenon hardly occurs between the plate member 32 and the electrode connection portion 48. Therefore, the adhesive material 81 is less likely to spread on the surface 32A. From another point of view, the area of the adhesive material 81 spreading on the surface 32A can be reduced.

As a result, changes in rigidity of the suspension 10 due to curing of the adhesive material 81 spread on the surface 32A hardly occur, and effects on characteristics such as vibration characteristics and load characteristics of the suspension 10 can be suppressed. As a result, it is possible to provide the suspension 10 capable of improving reliability.

In the present embodiment, since the wiring reinforcement portion 92 is provided in the electrode connection portion 48, the rigidity of the electrode connection portion 48 is hardly reduced. Furthermore, since the wiring reinforcement portion 92 is provided between the first penetration portion 36 and the second penetration portion 38, the size of the second region A2 adjacent to the terminal portion 54 can be reduced in the electrode connection portion 48. From another point of view, the distance between the terminal portion 54 and the wiring reinforcement portion 92 can be reduced. As a result, the rigidity of the electrode connection portion 48 in the vicinity of the terminal portion 54 can be improved.

Further, in the longitudinal direction X, the air layer 99 is located on the distal end side of the suspension 10 with respect to the wiring reinforcement portion 92. Since the electrode connection portion 48 is separated from the plate member 32, the adhesive material 81 is less likely to spread toward the distal end side of the suspension 10.

The wiring reinforcement portion 92 is provided separately from the main metal base 91. As described with reference to FIG. 5, the gap G1 is defined by the end portion 93 of the main metal base 91 and the end portion 94 of the wiring reinforcement portion 92. The distance from the plate member 32 to the electrode connection portion 48 in the gap G1 is larger than the distance from the plate member 32 to the electrode connection portion 48 (wiring reinforcement portion 92) in the first region A1 in the thickness direction Z.

As a result, even when the adhesive material 81 spreads between the plate member 32 and the wiring reinforcement portion 92, the adhesive material 81 hardly spreads from the wiring reinforcement portion 92 side toward the main metal base 91 side. Even when the adhesive material 81 spreads between the plate member 32 and the wiring reinforcement portion 92, the adhesive material 81 is less likely to spread over a range wider than the size of the wiring reinforcement portion 92.

According to the present embodiment, it is possible to provide the suspension 10 capable of improving reliability. In addition to the above description, various suitable effects can be obtained from the present embodiment.

Next, other embodiments will be described. Note that, in other embodiments and modifications described below, the same components as those of the first embodiment described above are denoted by the same reference numerals, and detailed description thereof may be omitted or simplified.

Second Embodiment

Figure 8:
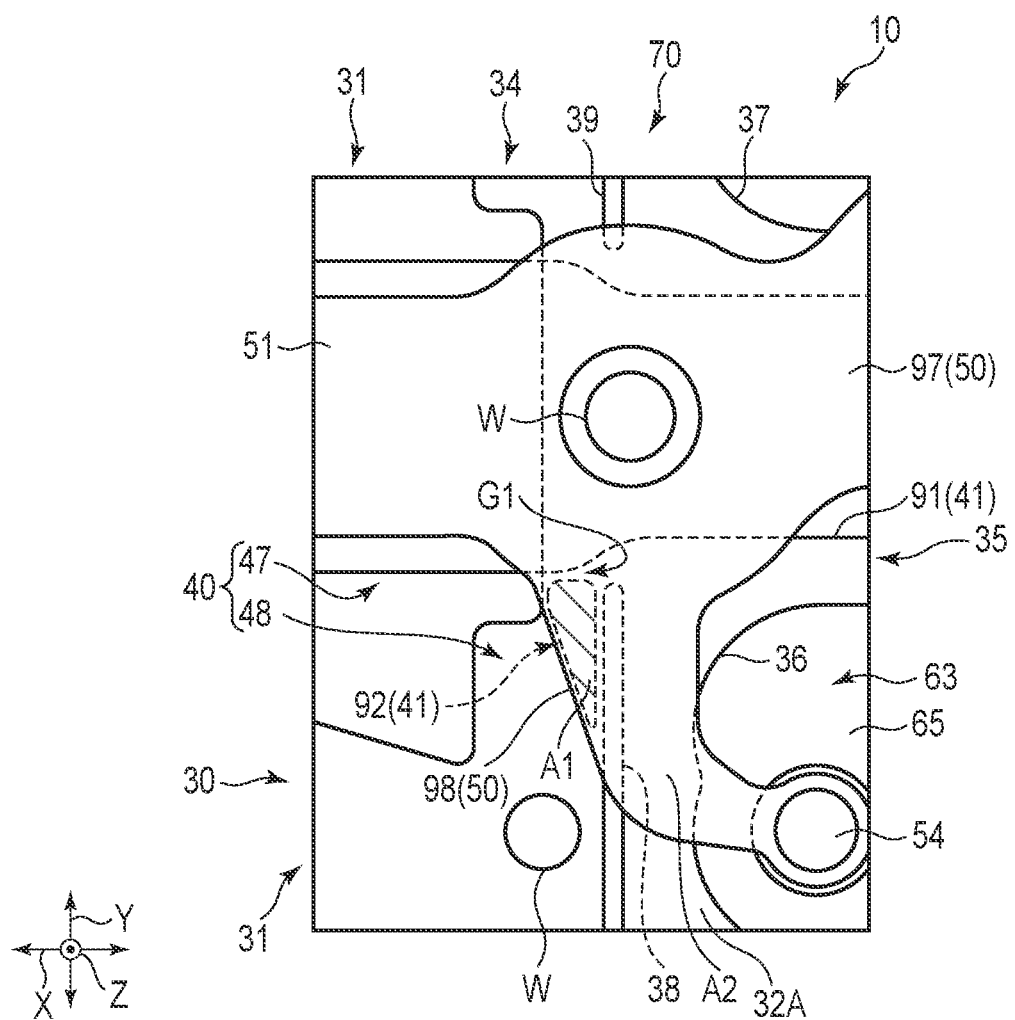
FIG. 8 is a schematic partially enlarged view of a suspension according to a second embodiment.

FIG. 8 is a schematic partially enlarged view of a suspension 10 according to the second embodiment. The second embodiment is different from the first embodiment in the position where a wiring reinforcement portion 92 is provided.

As shown in FIG. 8, in the longitudinal direction X, the second penetration portion 38 is provided so as to be positioned between the wiring reinforcement portion 92 and the first penetration portion 36. From another point of view, the wiring reinforcement portion 92 is located on the distal end side of the suspension 10 with respect to the second penetration portion 38. In the lateral direction Y, the wiring reinforcement portion 92 is separated from the main metal base 91. From another point of view, the wiring reinforcement portion 92 is separated from and independent of the main metal base 91.

In the longitudinal direction X, the wiring reinforcement portion 92 is separated from each of the first penetration portion 36 and the second penetration portion 38. From another point of view, the wiring reinforcement portion 92 does not overlap the first penetration portion 36 and the second penetration portion 38 in the thickness direction Z.

The electrode connection portion 48 has a first region A1 and a second region A2 having a thickness smaller than that of the first region A1. In the thickness direction Z, the second region A2 overlaps the second penetration portion 38. The second region A2 is formed in the electrode connection portion 48 so as to include a region overlapping the second penetration portion 38. In the longitudinal direction X, the second region A2 is formed from the second penetration portion 38 toward the first penetration portion 36.

In the configuration of the suspension 10 according to the second embodiment, the same functional effects as those of the first embodiment described above can be obtained. In the suspension 10 of the second embodiment, the wiring reinforcement portion 92 is located on the distal end side of the suspension 10 with respect to the second penetration portion 38.

Since the wiring reinforcement portion 92 is provided on the distal end side of the suspension 10 with respect to the second penetration portion 38, the wiring reinforcement portion 92 is not positioned between the first penetration portion 36 and the second penetration portion 38. The terminal portion 54 is easily moved in the first penetration portion 36 from the surface 32A side toward the surface 32B side in the thickness direction Z. From another point of view, the terminal portion 54 can be easily brought close to an electrode 65 of an actuator 63.

As a result, the terminal portion 54 and the electrode 65 of the actuator 63 can be easily connected, and the terminal portion 54 and the electrode 65 of the actuator 63 are more stably connected. As a result, it is possible to provide the suspension 10 capable of improving reliability.

Third Embodiment

Figure 9:
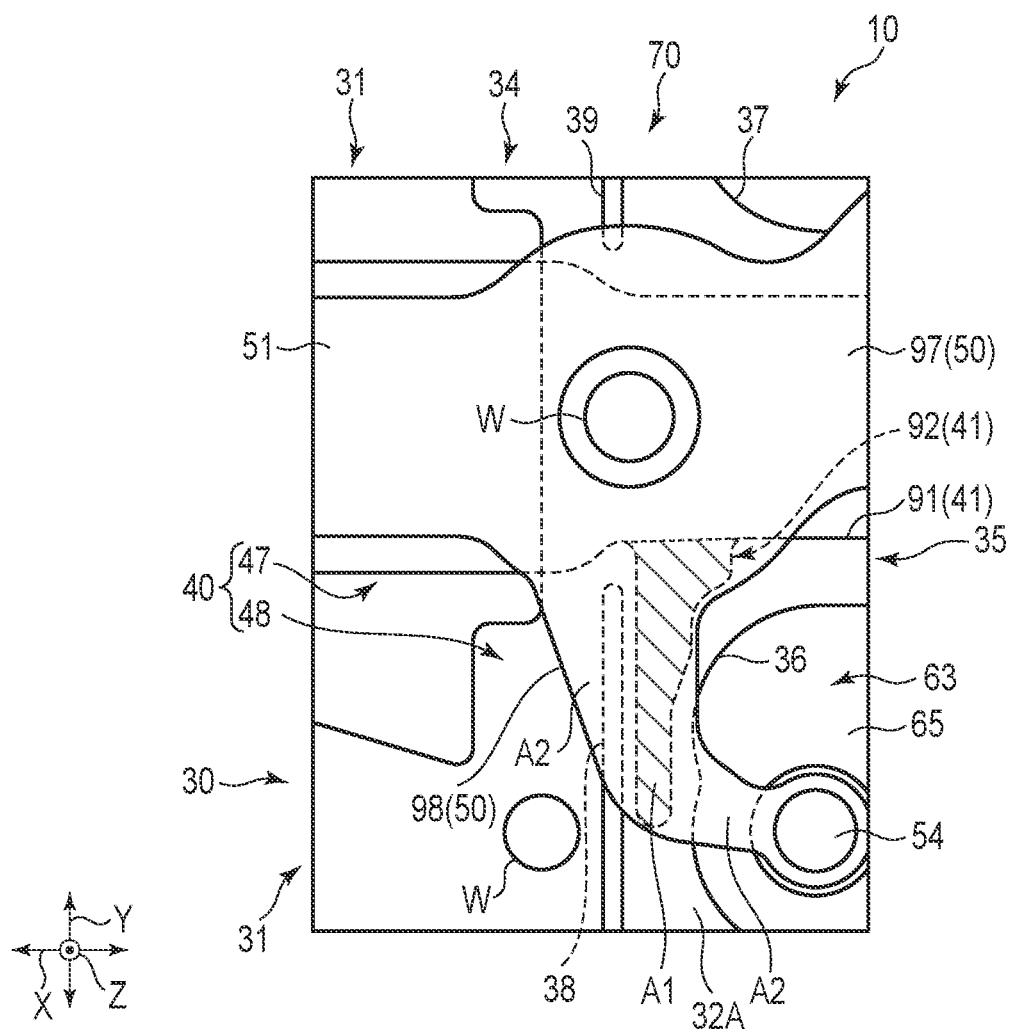
FIG. 9 is a schematic partially enlarged view of a suspension according to a third embodiment.

FIG. 9 is a schematic partially enlarged view of a suspension 10 according to a third embodiment. The third embodiment is different from the above-described embodiments in that a wiring reinforcement portion 92 is connected to a main metal base 91.

As shown in FIG. 9, in the longitudinal direction X, the wiring reinforcement portion 92 is provided so as to be positioned between the first penetration portion 36 and the second penetration portion 38. From another point of view, the wiring reinforcement portion 92 is located closer to the first penetration portion 36 than the second penetration portion 38.

The wiring reinforcement portion 92 extends from the main metal base 91. The wiring reinforcement portion 92 extends in the lateral direction Y along the second penetration portion 38. The wiring reinforcement portion 92 is connected to the main metal base 91 and is not separated from the main metal base 91. From another point of view, the wiring reinforcement portion 92 is formed integrally with the main metal base 91.

The electrode connection portion 48 has a first region A1 and a second region A2 having a thickness smaller than that of the first region A1. In the thickness direction Z, the second region A2 overlaps the second penetration portion 38. The second region A2 is formed in the electrode connection portion 48 so as to include a region overlapping the second penetration portion 38.

In the configuration of the suspension 10 according to the third embodiment, the same functional effects as those of each of the embodiments described above can be obtained. In the suspension 10 of the third embodiment, the wiring reinforcement portion 92 extends from the main metal base 91. Therefore, the suspension 10 according to the present embodiment can improve the rigidity of the electrode connection portion 48 in the lateral direction Y as compared with the suspension 10 according to each of the above-described embodiments.

Fourth Embodiment

Figure 10:
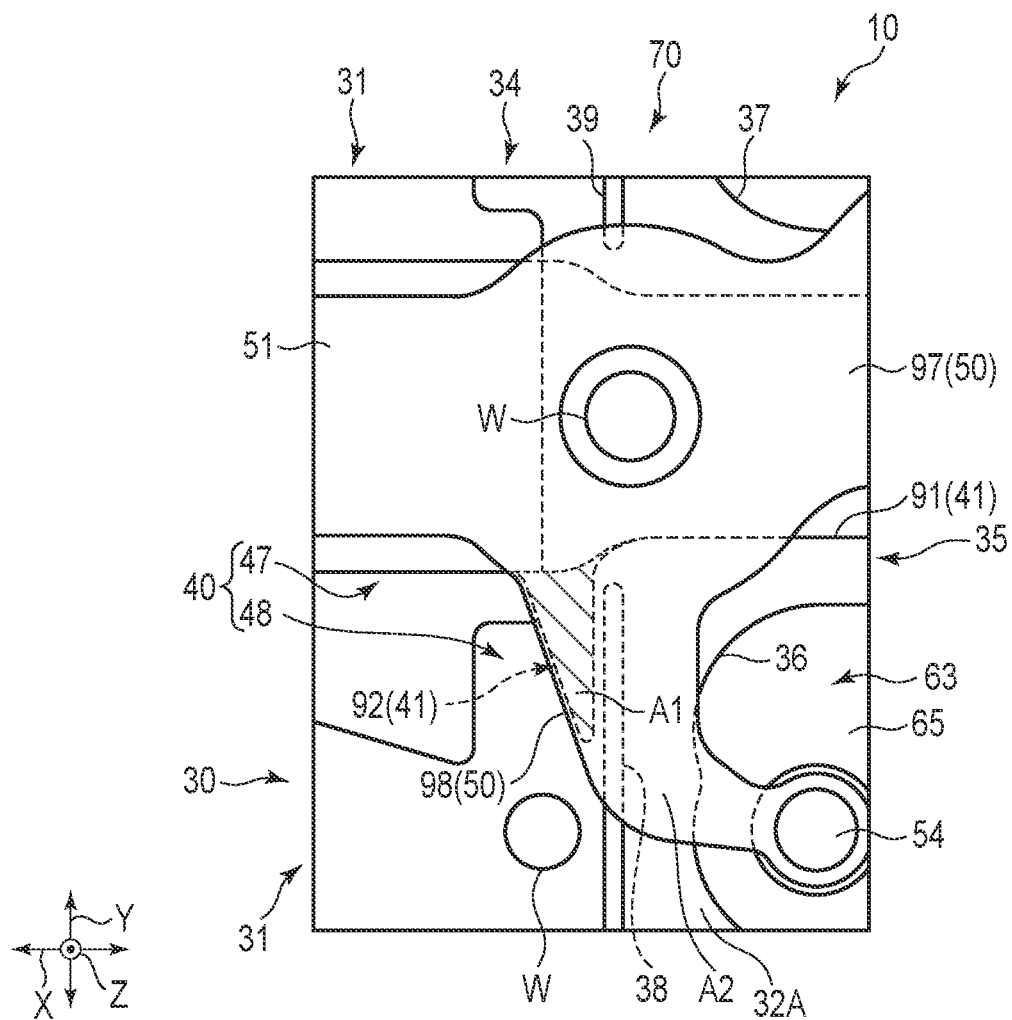
FIG. 10 is a schematic partially enlarged view of a suspension according to a fourth embodiment.

FIG. 10 is a schematic partially enlarged view of a suspension 10 according to a fourth embodiment. The fourth embodiment is different from the third embodiment in the position where a wiring reinforcement portion 92 is provided.

As shown in FIG. 10, in the longitudinal direction X, the second penetration portion 38 is provided so as to be positioned between the wiring reinforcement portion 92 and the first penetration portion 36. From another point of view, the wiring reinforcement portion 92 is located on the distal end side of the suspension 10 with respect to the second penetration portion 38.

The wiring reinforcement portion 92 extends from the main metal base 91. The wiring reinforcement portion 92 extends in the lateral direction Y along the second penetration portion 38. The wiring reinforcement portion 92 is connected to the main metal base 91 and is not separated from the main metal base 91. From another point of view, the wiring reinforcement portion 92 is formed integrally with the main metal base 91.

The electrode connection portion 48 has a first region A1 and a second region A2 having a thickness smaller than that of the first region A1. In the thickness direction Z, the second region A2 overlaps the second penetration portion 38. The second region A2 is formed in the electrode connection portion 48 so as to include a region overlapping the second penetration portion 38. In the configuration of the suspension 10 according to the fourth embodiment, the same functional effects as those of each of the embodiments described above can be obtained.

In carrying out the invention disclosed in the above embodiments, the specific aspects of the respective components constituting the suspension 10 for a disk drive can be variously changed, including the specific aspects such as the shapes of the base plate 20, the load beam 30, and the flexures 40.

In each of the above-described embodiments, the wiring reinforcement portion 92 is provided on one of the distal end side of the suspension 10 with respect to the second penetration portion 38 and the fixed portion 22 side of the base plate 20, but the wiring reinforcement portion 92 may be provided on both the distal end side of the suspension 10 with respect to the second penetration portion 38 and the fixed portion 22 side of the base plate 20. As a result, the rigidity of the electrode connection portion 48 can be further improved. As a result, it is possible to provide the suspension 10 capable of improving reliability.

In each of the above-described embodiments, the wiring reinforcement portion 92 may have a portion protruding from the branch wiring portion 98. From another point of view, the wiring reinforcement portion 92 may have a portion that does not overlap with the branch wiring portion 98. The protruding portion may protrude in the longitudinal direction X or in the lateral direction Y with respect to the branch wiring portion 98.

In each of the above-described embodiments, a TSA suspension is disclosed as an example of the suspension 10, but the present invention can also be applied to a DSA suspension in which an actuator is not mounted on the magnetic head side. In each of the above-described embodiments, a pair of actuators is mounted on the base plate side, but the number of mounted actuators is not limited to the above-described example.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disk drive comprising:
a plate member having a first surface, a second surface opposite to the first surface, a first penetration portion penetrating the first surface and the second surface, and a second penetration portion spaced from the first penetration portion and penetrating the first surface and the second surface;
an actuator provided on the second surface and having an electrode located in the first penetration portion; and
a flexure having an electrode connection portion connected to the electrode,
wherein the electrode connection portion includes a first region and a second region having a thickness smaller than a thickness of the first region, and
the second region overlaps the second penetration portion in a thickness direction of the flexure.

2. The suspension for a disk drive according to claim 1, wherein
the flexure includes a metal base overlaid on the first surface and a wiring portion overlaid on the metal base, and
in the first region, the metal base includes a wiring reinforcement portion.

3. The suspension for a disk drive according to claim 2, wherein
the second penetration portion is located on a distal end side of the flexure with respect to the first penetration portion in a longitudinal direction, and
the wiring reinforcement portion is located between the first penetration portion and the second penetration portion in the longitudinal direction.

4. The suspension for a disk drive according to claim 2, wherein
the second penetration portion is located on a distal end side of the flexure with respect to the first penetration portion in the longitudinal direction, and
the second penetration portion is located between the wiring reinforcement portion and the first penetration portion in the longitudinal direction.

5. The suspension for a disk drive according to claim 2, wherein
the flexure further includes a flexure main body to which the electrode connection portion is connected, and
the wiring reinforcement portion is separated from the metal base of the flexure main body.

6. The suspension for a disk drive according to claim 2, wherein
the flexure further includes a flexure main body to which the electrode connection portion is connected, and
the wiring reinforcement portion extends from the metal base of the flexure main body.

7. The suspension for a disk drive according to claim 1, further comprising:
an adhesive material provided between the plate member and the actuator, wherein at least a part of the adhesive material is provided in the second penetration portion.

\* \* \* \* \*